United States Patent [19]

Noll et al.

[11] Patent Number: 5,365,361
[45] Date of Patent: Nov. 15, 1994

[54] COHERENT OPTICAL MULTI-CHANNEL ARRANGEMENT

[75] Inventors: Bernd Noll; Alfred Ebberg; Reinhold Noe, all of Munich, Germany

[73] Assignee: Siemens Aktiengesellschaft, Munich, Germany

[21] Appl. No.: 74,424

[22] Filed: Jun. 10, 1993

[30] Foreign Application Priority Data

Jun. 17, 1992 [DE] Germany .................. 4219926

[51] Int. Cl.$^5$ ........................................... H04B 10/00
[52] U.S. Cl. .................................. 359/161; 359/125;
  359/181; 359/182; 359/191; 359/111
[58] Field of Search ............... 359/127, 133, 161, 164,
  359/172, 181, 191, 125, 182, 154, 157, 120–121,
  111

[56] References Cited

U.S. PATENT DOCUMENTS 4,989,201  1/1991  Glance ........................ 359/133
5,016,242  5/1991  Tang .......................... 359/124

OTHER PUBLICATIONS

Kazovsky et al, "Experimental Releative Frequency Stabilization of a Set of Lasers Using Optical Phase–Locked Loops", *IEEE Photonics Technology Letters*, vol. 2, No. 7, Jul. 1990, pp. 516–518.

Noe et al, "Accurate Simple Optical Frequency Stabilization for a Coherent Multichannel System", *IEEE Photonics Technology Letters*, vol. 4, No. 5, May 1992, pp. 505–506.

Ishida et al, "0.04 Hz Relative Optical–Frequency Stability in a 1.5 μm Distributed–Bragg–Reflector (DBR) Laser", *IEEE Photonics Technology Letters*, vol. 1, No. 12, Dec. 1989, pp. 452–454.

Primary Examiner—Richard E. Chilcot, Jr.
Assistant Examiner—Kinfe-Michael Negash
Attorney, Agent, or Firm—Hill, Steadman & Simpson

[57] ABSTRACT

A stabilization of the frequency spacing between the carrier frequency channels of the individual transmitters and the elimination of the risk of the channel crosstalk is obtained for an arbitrarily large number of transmitters in a coherent optical multi-channel arrangement which has a plurality of transmitters arranged in a group, a single coherent optical heterodyne arrangement for heterodyning a portion of the output of each of the transmitters with respective reference frequency lines and a control arrangement for controlling the channel carrier frequency of each of the transmitters by utilizing the heterodyne signal.

9 Claims, 3 Drawing Sheets

COHERENT OPTICAL MULTI-CHANNEL ARRANGEMENT

BACKGROUND OF THE INVENTION

The present invention is directed to a coherent optical multi-channel arrangement composed of a plurality of spatially distributed optical transmitters which will transmit optical information signals that are frequency-modulated with a modulation frequency from a predetermined modulation frequency range, said transmitters transmitting said optical information signals on carrier frequency channels with channel carrier frequencies that differ from one another with such a small channel frequency spacing that crosstalk can occur due to transmitter instabilities, said plurality of transmitters forming one or more groups spatially separated from one another composed of, respectively, a plurality of spatially-adjusted transmitters, wherein a coherent optical heterodyning arrangement is provided for receiving a part of the information signal emitted by the transmitters on the carrier frequency channel and generate an optical heterodyne signal by superimposing this part with the light of a reference frequency that is fixed in terms of frequency and lies at the channel carrier frequency of the information signal, the reference frequency line being from an optical frequency comb spectrum composed of a plurality of reference frequency lines that are fixed in terms of frequency and have fixed reference frequencies that lie at different channel carrier frequencies and are arranged at a slight channel frequency spacing from one another, the arrangement includes a supervisory arrangement provided for controlling the channel carrier frequencies of every optical transmitter, dependent on the heterodyne signal generated by superimposing the part of the information signal emitted by said transmitter with the channel carrier frequency of the transmitter with the light of the reference frequency line of the reference comb spectrum so that a frequency change of the channel carrier frequency in this heterodyne signal will be cancelled.

A coherent optical multi-channel arrangement is disclosed in an article by Ishida et al entitled "0.04 Hz Relative Optical-Frequency Stability in a 1.5 $\mu$m Distributed-Bragg-Reflector (DBR) Laser", *IEEE Photonic Technology Letters*, Vol. 1, No. 12, December 1989, pp. 452–454. In order to avoid a crosstalk between the carrier frequency channels having the small frequency spacing, for example 5 GHz through 10 GHz, in this arrangement, a separate coherently optical heterodyning or superimposing means is provided for each of the transmitters for the stabilization of the frequency spacing of the individual transmitters so that the same number of such heterodyning means as transmitters are provided.

In this known arrangement, the reference laser generates a reference comb spectrum, for example with the assistance of an external modulator, so that the reference frequency lines of this reference comb spectrum are arranged at a frequency spacing from one another that is the same as the slight frequency spacing between the carrier frequency channels. A part of the optical information signal emitted by the transmitter is superimposed with the light of the reference frequency line of the reference comb spectrum belonging to the particular transmitter in every heterodyning means, for example a heterodyne receiver, which is allocated to the transmitter, so that the fixed reference frequency of this reference frequency line is the same as the channel carrier frequency of the carrier frequency channel of the transmitter. Via a phase or frequency control loop, the channel carrier frequency of the transmitting laser is readjusted to give a frequency deviation wherein the intermediate frequency contained in the heterodyne signal due to the superimposition of the part of the information signal of the transmitter with the light of the appertaining reference frequency line of the heterodyning means belonging to this transmitter remains constant, and this intermediate frequency is then equal to a difference between the channel carrier frequency of the transmitter and the reference frequency of the reference frequency line.

Since a separate heterodyning means is provided for every transmitter in this known arrangement, a considerable outlay for frequency control is necessary given such an arrangement with many transmitters. Many transmitters will be provided given a space and frequency switching or a TV distribution system having coherent technology.

SUMMARY OF THE INVENTION

The object of the present invention is to provide a stabilization of the frequency spacing between the carrier frequency channels of individual transmitters and, thus, an elimination of the risk of crosstalk between the carrier frequency channels for an arbitrarily great number of transmitters with optimally little outlay.

To accomplish these goals, the present invention is directed to providing a coherent optical multi-channel arrangement composed of a plurality of spatially distributed, optical transmitters transmitting optical information signals frequency-modulated with a modulation frequency from a predetermined modulation frequency range, each of the transmitters transmitting the optical information signals on carrier frequency channels with channel carrier frequencies that differ from one another with such a small channel frequency spacing that a risk of crosstalk between the carrier frequency channels due to any instability during operation of one or more transmitters, wherein the plurality of transmitters forms one or more groups spatially separated from one another composed of, respectively, a plurality of spatially adjusted transmitters, means for forming an optical frequency comb spectrum composed of a plurality of reference frequency lines that are fixed in terms of frequency and have fixed reference frequencies that lie at different channel carrier frequencies and are arranged in the slight channel frequency spacing from one another, each transmitter having means for frequency-modulating on each of the information signals emitted by each of the transmitters of the group a periodic identification signal having a fixed repetition frequency individually allocated to each transmitter for identifying the carrier frequency of that respective transmitter; means for removing parts of the information signal emitted by the transmitter, optical heterodyning means being allocated to the common group and provided for the reception of the parts of the information signal emitted by all of the transmitters of the group of various channel frequencies and for generating an optical heterodyne signal composed of individual heterodyne signals whereby the individual heterodyne signals are formed by superimposing the parts of each of the information signals with the light of the reference frequency line lying at the channel carrier frequency of this information signal coming from the reference comb spectrum allocated to the group of transmitters and supervisory means being provided for controlling the channel frequencies of the group of optical transmitters, dependent on the heterodyne signal generated by superimposing the parts of the information signal emitted by the transmitters with the channel carrier frequency of the transmitters with the light of the reference frequency of the reference comb spectrum that lies at this channel frequency so that the frequency changes of the channel frequency in this heterodyning signal will be cancelled, the supervisory means including filter means charged with the multiple heterodyne signal, said filter means being transmissive for the repetition frequencies of the identification signals and the frequency changes of the identification signals and the frequency changes of the channel carrier frequencies contained in the multiple heterodyne signal, but not being transmissive for the higher frequencies that are otherwise contained in the multiple heterodyne signal including the channel carrier frequencies of the carrier frequency channels of the transmitters of the group and the modulation frequencies of the frequency-modulated information signals, said filter means creating an output of a filter signal that is contained with information about the repetition frequencies, the frequency changes and the allocation of the frequency changes to the repetition frequencies, and the supervisory means including control means for generating a respective control signal for every transmitter of the group for controlling the channel carrier frequency of each transmitter, dependent on the information contained in the filter signal about the repetition frequency of the transmitter and about the frequency change of the channel carrier frequency of each transmitter allocated to the repetition frequency such that an existing frequency change of the channel carrier frequency or, respectively, of the transmitter is cancelled.

The arrangement of the invention has the advantage that a common, coherently optical heterodyning means is employed for the frequency control of each group of spatially adjusted transmitters, the number of these heterodyning means being considerably reduced as a result of this arrangement. The arrangement of the invention, however, also has the advantage that it is not only transmitters that are in close spatial proximity, but also transmitters that are spatially situated far from one another that can be stabilized. Several different groups of transmitters can comprise the same or different numbers of transmitters.

The filter signal from the filter means can be further processed with a phase-sensitive rectification. Preferably and advantageously, the arrangement of the invention is fashioned wherein the filter means includes a sub-filter means charged with a multiple heterodyne signal, said sub-filter being transmissive for the repetition frequencies, identification signals and at the frequency changes of the channel carrier frequencies contained in the multiple heterodyne signal, but not being transmissive for the higher frequencies otherwise contained in a multiple heterodyne signal including the channel carrier frequencies and the modulation frequencies of the information signal, said sub-filter means creating the filter signal that contains these repetition frequencies and these frequency changes, said filter means including transducer means for converting the filter signal into an amplitude signal that has an amplitude and/or phase that is dependent on the frequency deviations of the channel carrier frequencies and the repetition frequencies of the identification signals contained in the filter signal, said filter means including means for generating the filter signal in the form of a Fourier transform of the amplitude signal with Fourier coefficients unambiguously allocated to the repetition frequencies, wherein every Fourier coefficient contains an information about a frequency deviation of the channel carrier frequency belonging to the repetition frequency of this Fourier coefficient.

The transducer means of the supervisory means advantageously comprises a transducer characteristic for every individual heterodyne signal of every transmitter of a group with which the transducer characteristic, the amplitude of the amplitude signal output by the transducer monotonously rises with the increase as well as with the decrease of the modulation frequency, both given a modulation frequency of the information signal emitted by the transmitter that increases in comparison to every channel carrier frequency, as well as decreases in comparison thereto.

Particularly in the case wherein the frequency-modulated information signals are binary signals that can only assume two modulation frequency statuses, it is expedient that when these two modulation frequencies statuses are situated at the same frequency spacing from the left and the right of the appertaining channel carrier frequency. It is advantageous in this case when the characteristics of the transducer at this frequency spacing has the same amplitude so that the intermediate frequency contained in the appertaining individual heterodyne signal of the multiple heterodyne signal is the same for the modulation frequency status of the information signal that indicates the one binary value as well as that indicates the other binary value.

It is especially advantageous when the intermediate frequency contained in all the individual heterodyne signals are identical to one another, because then only one intermediate frequency need be taken into consideration with reference to the filter means.

The control speed of the arrangement of the invention can be advantageously increased in that the identification signal of the carrier frequency channel of a transmitter is composed not only of the fundamental wave of the repetition frequency, but is also composed of a harmonic that at least contains the doubled repetition frequency. The increase in the control speed is achieved by simultaneously detecting both the fundamental wave as well as the wave having double the repetition frequency. This method is particularly advantageous given great changes in the channel carrier frequency.

The identification signal of the carrier frequency channel is preferably not a sine wave but a square wave wherein the double repetition frequency is contained. One advantage of the square wave is that this wave can be generated in a simple way by a digital circuit.

The reference comb spectrum is preferably generated by a comb generator. It can therefore be advantageous when a common comb generator for generating a reference comb spectrum containing reference lines with reference frequencies for the channel carrier frequencies of all transmitters is provided for a plurality of coherently optical heterodyning means that are allocated to different groups of spatially proximate transmitters or to one or more transmitters at a great distance from a group of other transmitters.

The invention shall be set forth in greater detail with further objects and advantages being evident from the

DESCRIPTION OF THE PREFERRED EMBODIMENTS

Figure 1:
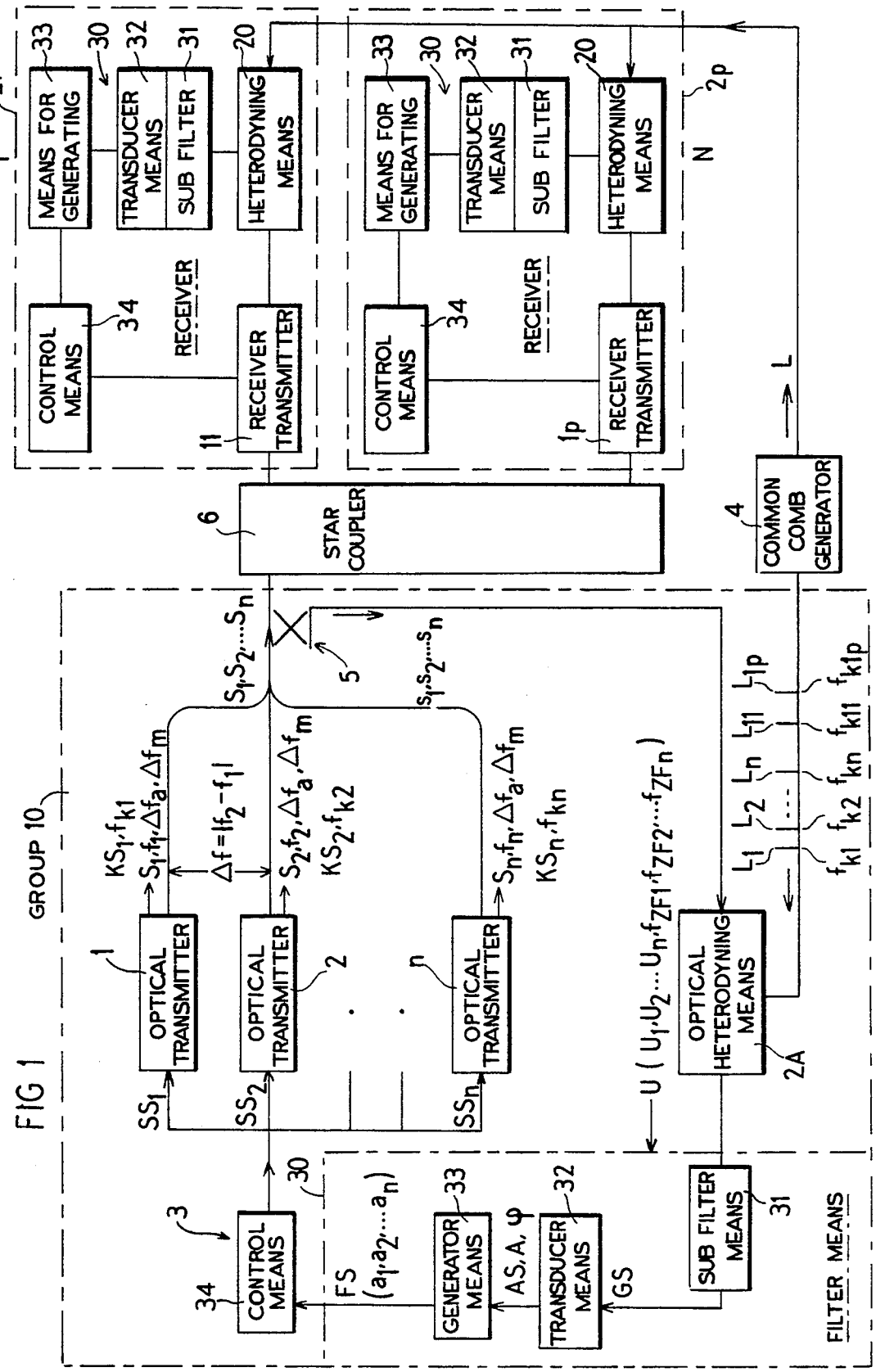
FIG. 1 is a block circuit diagram of an exemplary embodiment of a multi-channel arrangement of the invention in a simplified illustration.

The principles of the present invention are particularly useful when incorporated in the arrangement illustrated in FIG. 1. The arrangement of FIG. 1 has a group 10 of optical transmitters 1, 2, ... n in close spatial proximity and a plurality of receivers 21, ... 2p. A plurality of the groups 10 can be present, wherein the number of transmitters 1, 2, ... n can be the same or different from one group to another. For example, one group can be a TV distribution station.

Every transmitter 1, 2, ... n of the group 10 transmits optical information signals $S_1, S_2, \ldots S_n$ on a carrier frequency channel allocated to the transmitters 1, 2, ... n, which have a channel carrier frequency of $f_1, f_2, \ldots f_n$ that is frequency-modulated with a modulated frequency $f_m$ from a predetermined modulation frequency range $\Delta f_m$ that corresponds to a great frequency sweep or deviation. The channel carrier frequencies $f_1, f_2, \ldots f_n$ of the various transmitters 1, 2, ... n differ from one another and have a channel frequency spacing $\Delta f$ that can be the same or different from channel carrier frequency to channel carrier frequency.

Figure 2:
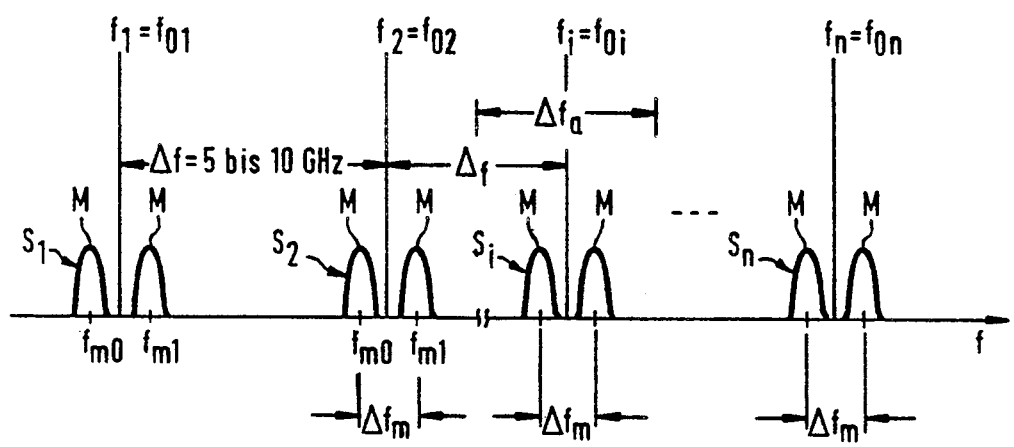
FIG. 2 is a frequency-related position of the modulation spectra of the frequency-modulated information signals emitted by various transmitters with reference to the channel carrier frequencies of the various transmitters.

As illustrated in FIG. 2, the channel carrier frequencies $f_1, f_2, \ldots f_i \ldots f_n$ for the information signals $S_1, S_2, \ldots S_i \ldots S_n$ of the various transmitters 1, 2, ... n are shown on a frequency axis f in the channel frequency spacing $\Delta f$ from one another. The two lobes M to the left and right of every channel carrier frequency $f_1, f_2, \ldots f_i \ldots f_n$ respectively comprises the modulation frequency spectrum of the one of the frequency-modulated information signals $S_1, S_2, \ldots S_n$ that is modulated with one of the respective channel carrier frequencies $f_1, f_2, \ldots f_n$.

When the channel frequency spacing $\Delta f$ is extremely small, for example only 5 GHz through 10 GHz, there is the risk of a channel crosstalk that can be caused by instabilities of the transmitters 1, 2, ... n during their operation. The channel carrier frequencies $f_1, f_2, \ldots f_n$ are then not fixed on the frequency axis f in FIG. 2, but exhibit frequency changes $\Delta f_a$. This means that a channel carrier frequency, for example the channel carrier frequency $f_i$ in FIG. 2 will migrate in frequency range $\Delta f_a$, which range can be different for different transmitters and is dependent on the transmitter that generates the frequency $f_i$.

In order to suppress these frequency changes $\Delta f_a$ and to maintain the channel carrier frequencies $f_1, f_2, \ldots f_n$ constant and fixed on the frequency axis f in FIG. 2, each of the frequency-modulated information signals $S_1, S_2, \ldots S_n$ respectively emitted by the transmitters 1, 2, ... n of the group 10 is additionally frequency-modulated with a respective periodic identification signal $KS_1, KS_2 \ldots KS_n$. The periodic identification signals $KS_1, KS_2 \ldots KS_n$ respectively have fixed repetition frequencies $f_{k1}, f_{k2}, \ldots f_{kn}$ individually allocated to the transmitters 1, 2, ... n for the identification of the carrier frequency channel of each of the respective transmitters 1, 2, ... n.

Moreover, a coherently optical heterodyning means 2A is provided for receiving (tapping) parts $s_1, s_2, \ldots s_n$ of the information signals $S_1, S_2, \ldots S_n$ emitted by the transmitters 1, 2, ... n of the group 10 on the various channel carrier frequencies $f_1, f_2, \ldots f_n$ and for generating a multiple heterodyne signal U composed of individual heterodyne signals $U_1, U_2, \ldots U_n$. The optical heterodyne means is allocated in common to this group 10 of transmitters.

The parts $s_1, s_2, \ldots s_n$ are acquired, for example, with an optical directional coupler 5 to which all information signals $S_1, S_2, \ldots S_n$ are supplied. The individual heterodyne signals $U_1, U_2, \ldots U_n$ are formed in the heterodyning means 2A by superimposing the pans $s_1, s_2, \ldots s_n$ of each of the information signals $S_1, S_2, \ldots S_n$ with the light of reference frequency lines $L_1, L_2, \ldots L_n$ forming a reference comb spectrum L, which is allocated to the group 10 of transmitters. The lines $L_1, L_2, \ldots L_n$ are respectively at reference frequencies $f_{01}, f_{02}, \ldots f_{0n}$.

The reference comb spectrum L is preferably generated by a comb generator 4.

The reference frequencies $f_{01}, f_{02}, \ldots f_{0n}$ exhibit no fluctuations and are fixed on the frequency axis f in FIG. 2. Without limitation on the universality, it is assumed that with reference to FIG. 2, every channel carrier frequency $f_1, f_2, \ldots f_n$ coincides with the allocated frequency $f_{01}, f_{02}, \ldots f_{0n}$ of the respective reference frequency lines $L_1, L_2, \ldots L_n$ of the reference comb spectrum L when there is no frequency change $\Delta f_a$ of these frequencies $f_1, f_2, \ldots f_n$.

Over and above this, supervisory means 3 is provided that comprises a filter means 30 which is charged with the multiple heterodyne signal U or with a corresponding multiple heterodyne signal acquired after an optoelectrical conversion. This filter means 30 is transmissive for the repetition frequencies $f_{k1}, f_{k2}, \ldots f_{kn}$ of the identification signals $KS_1, KS_2 \ldots KS_n$ and the frequency change $\Delta f_a$ of the channel carrier frequencies $f_1, f_2, \ldots f_n$ contained in the multiple heterodyne signal U. However, the filter means is not transmissive for the higher frequencies otherwise contained in the multiple heterodyne signal U which includes the channel carrier frequencies $f_1, f_2, \ldots f_n$ of the carrier frequency channels of each of the transmitters of the group and the modulation frequency $f_m$ of the frequency-modulated information signals $S_1, S_2, \ldots S_n$. The filter means 30 has an output of a filter signal FS that contains information about these repetition frequencies $f_{k1}, f_{k2}, \ldots f_{kn}$, and these frequency changes $\Delta f_a$ and the allocation of these frequency changes $\Delta f_a$ to the repetition frequencies $f_{k1}$, $f_{k2}$, ... $f_{kn}$.

The supervisory means 3 also includes a control means 34 for generating respectively control signals $SS_1$, $SS_2$, ... $SS_n$ for every transmitter 1, 2, ... n of the group 10 for controlling the channel carrier frequencies $f_1$, $f_2$, ... $f_n$ of these transmitters, dependent on the information contained in the filter signal FS about the identification frequencies $f_{k1}$, $f_{k2}$, ... $f_{kn}$ of the transmitters and about the frequency change $\Delta f_a$ of the channel frequencies $f_1$, $f_2$, ... $f_n$ of the transmitters allocated to the identification frequencies $f_{k1}$, $f_{k2}$, ... $f_{kn}$ so that the existing frequency change $\Delta f_a$ of the channel carrier frequencies $f_1$, $f_2$, ... $f_n$ of the transmitters will be cancelled. Thus, the channel carrier frequencies $f_1$, $f_2$, ... $f_n$ of every transmitter will no longer change and are firmly fixed at: the allocated reference frequencies $f_{01}$, $f_{02}$, ... $f_{0n}$ of the reference comb spectrum L.

A control signal for follow-up or tracking of the channel carrier frequencies $f_1$, $f_2$, ... $f_n$ of every transmitter of the group 10 can be obtained from the filter signal FS by a phase-sensitive rectification, for example with a lock-in detection, at every identification frequency $f_{k1}$, $f_{k2}$, ... $f_{kn}$. A simpler method implements a fast Fourier transformation wherein the amount of the phase of the detected identification frequencies $f_{k1}$, $f_{k2}$, ... $f_{kn}$ are present as values and can be employed for the frequency follow-up. To this end, the filter means 30 of the supervisory means 3 preferably includes sub-filter means 31 charged with the multiple heterodyne signal U or with the correspondingly opto-electrically converted multiple heterodyne signal, and this second or sub-filter means 31 is transmissive for the repetition frequencies $f_{k1}$, $f_{k2}$, ... $f_{kn}$ contained in the multiple heterodyne signals U for the identification signals $KS_1$, $KS_2$ ... $KS_n$ and for the frequency changes $\Delta f_a$ of the channel carrier frequencies $f_1$, $f_2$, ... $f_n$. However, the sub-filter means is not transmissive for the higher frequencies otherwise contained in the multiple heterodyne signal U including the channel frequencies $f_1$, $f_2$, ... $f_n$ and the modulation frequencies $f_m$ of the information signals $S_1$, $S_2$, ... $S_n$, the sub-filter means 31 creates an output or sub-filter signal GS that contains these repetition frequencies $f_{k1}$, $fk_{k2}$, ... $f_{kn}$ and these frequency changes $\Delta f_a$. A transducer or converter means 32 is also provided for converting the sub-filter signal GS into an amplitude signal AS having an amplitude A and/or a phase $\phi$ dependent on the frequency deviation $\Delta f_a$ of the channel carrier frequencies $f_1$, $f_2$, ... $f_n$ and the repetition frequencies $f_{k1}$, $f_{k2}$, ... $f_{kn}$ of the identification signals $KS_1$, $KS_2$ ... $KS_n$ contained in the sub-filter signal GS. Over and above this, means 33 is provided for generating the filter signal FS in the form of a Fourier-transform of the amplitude signal AS having Fourier coefficients $a_1$, $a_2$, ... $a_n$ unambiguously allocated to the repetition frequencies $f_{k1}$, $f_{k2}$, ... $f_{kn}$ so that the Fourier coefficients $a_1$, $a_2$, ... $a_n$ contain the information about the frequency deviation $\Delta f_a$ of the channel carrier frequencies $f_1$, $f_2$, ... $f_n$ belonging to the repetition frequencies $f_{k1}$, $f_{k2}$, ... $f_{kn}$ of this Fourier coefficient $a_1$, $a_2$, ... $a_n$.

The Fourier transformation can be advantageously implemented with a computer, for example a personal computer.

In the realization of the exemplary embodiment of FIG. 1, a reference laser was modulated upon employment of a $LiNbO_3$ phase modulator having a periodic electrode structure. A drive power of 1 W at 10.368 GHz was adequate for generating seven reference lines of the reference comb spectrum. The frequency of the reference laser was stabilized. The individual transmitters were identified by identification signals having a repetition frequency of a few kHz, for example approximately 6 kHz, wherein the repetition frequencies differed from one another by a few ten of MHz, for example 60 MHz. The amplitude signal output by the transducer 32 was sampled in amplitude and phase at a computer that calculated the Fourier transform of this amplitude signal. The Fourier coefficient of the Fourier transform corresponding to a specific repetition frequency was divided by a complex reference constant, so that the real part of the quotient is proportional to the frequency change of the channel carrier frequency of the transmitter allocated to this repetition frequency from the reference frequency of the appertaining reference frequency line of the reference comb spectrum. The reference constant was selected equal to the Fourier coefficient that was earlier selected in the presence of an intentional and known frequency change of the channel carrier frequency of the selected transmitter and served for calibration. All transmitters can be stabilized in parallel with the described method, since the calculation of the Fourier transform and the correction of the frequency can be simultaneously implemented for all transmitters.

Figure 3:
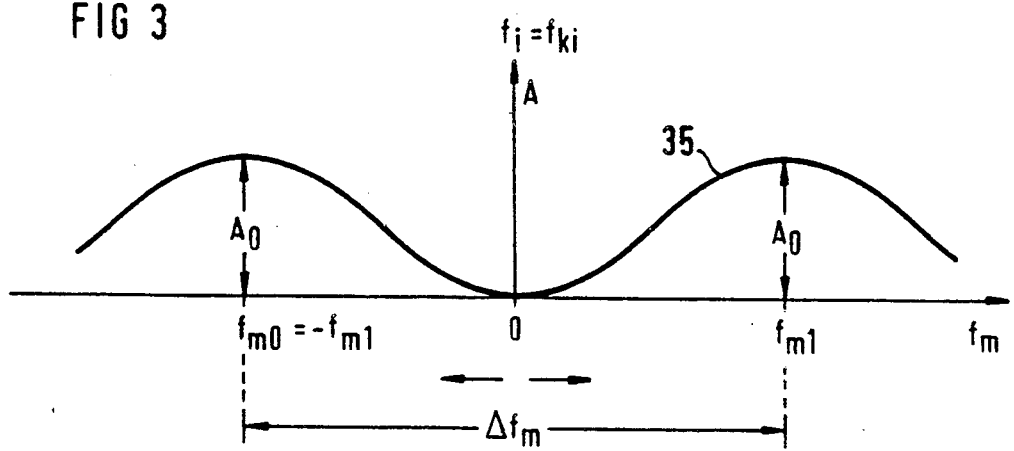
FIG. 3 is a preferred transducer characteristic of a transducer of the exemplary embodiment for the selected channel carrier frequency, wherein the amplitude of the amplitude signal is shown dependent on the modulation frequency of the information signal belonging to this channel carrier frequency.

When the frequency-modulated information signals are binary signals, it is expedient when the transducer 32 comprises a transducer characteristic shown by a curve 35 of FIG. 3 for every individual heterodyne signal $U_1$, $U_2$, ... $U_n$ of every transmitter 1, 2, ... n of every group 10 wherein the amplitude A of the amplitude signal AS output by the transducer 32 monotonously rises with the increase as well as with the decrease of the modulation frequency $f_m$ given a modulation frequency $f_m$ of the information signals $S_1$, $S_2$, ... $S_n$ emitted by the transmitters 1, 2, ... n that increase in comparison to every channel carrier frequency $f_1$, $f_2$, ... $f_n$ as well as the decrease in comparison thereto. The curve 35 has the same amplitude $A_0$ at specific frequency spacings $f_{m0}$, $f_{m1}$ of the modulation frequency $f_m$ of every information signal $S_1$, $S_2$, ... $S_n$ having the channel carrier frequencies $f_1$, $f_2$, ... $f_n$ of the transmitters 1, 2, ... n emitted by the transmitters 1, 2, ... n. Such a characteristic is shown in FIG. 3 for the channel carrier frequency fi having i=1, 2, ... n. The binary values of the frequency-modulated transmission signals are allocated to the defined frequency spacing $f_{m0}$, and $f_{m1}$. This characteristic has the advantage that the same intermediate frequency signal is received for both binary values of the binary signal when the channel carrier frequency of the selected transmitter is centered with respect to the modulation frequency spectrum M, as indicated in FIG. 2.

It is also expedient when the intermediate frequencies $f_{ZF1}$, $f_{ZF2}$, ... $f_{ZFn}$ that are contained in all individual heterodyne signals $U_1$, $U_2$, ... $U_n$ and that are respectively established by a difference between the channel carrier frequencies $f_1$, $f_2$, ... $f_n$ and the reference frequencies $f_{01}$, $f_{02}$, ... $f_{0n}$ of each and every individual heterodyne signal $U_1$, $U_2$, ... $U_n$ are identical to one another. This simplifies the filtration of the multiple heterodyne signal U.

An increase in the control speed, particularly given great deviation of the intermediate frequency from a rated intermediate frequency due to instabilities of transmitters can be achieved by a simultaneous detection both of the fundamental having for the respective identification signals the repetition frequencies $f_{k1}$, $f_{k2}$, ... $f_{kn}$ and the harmonic having for the respective identification signals the frequencies $2f_{k1}$, $2f_{k2}$, ... $2f_{kn}$ (i.e., twice the respective repetition frequencies).

Figure 4A:
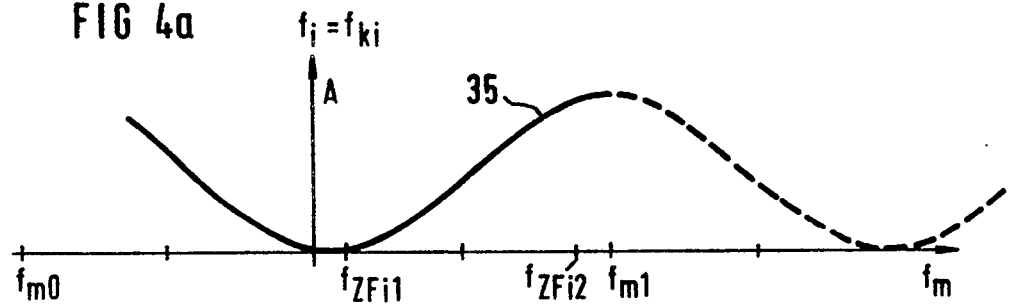
FIGS. 4a–4c are graphs illustrating the transducer characteristics of FIG. 3 of the output signal of the transducer given detection of the fundamental wave of the identification signal of the selected carrier frequency channel and the output signal of the transducer given detection of the first harmonic of the identification signal having double the repetition frequency shown in relation to one another.
Figure 4B:
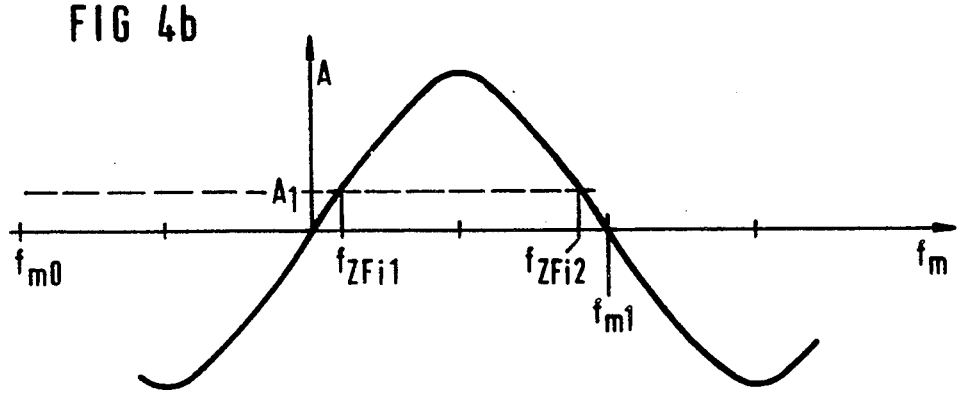

As proceeds from FIG. 4b, it is possible that the detection of only the fundamental wave of the identification signal makes no statement possible as to whether the intermediate frequency amounts to $f_{ZFi1}$ or $f_{ZFi2}$, since the same amplitude $A_1$ is detected in both instances.

Figure 4C:
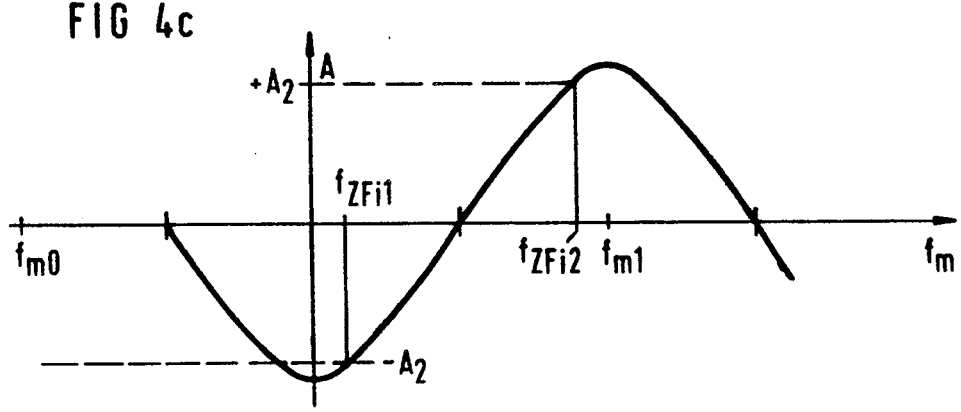

When one simultaneously considers the harmonic illustrated in FIG. 4c having double the repetition frequency, then the polarity of the amplitude $A_2$ at these intermediate frequencies $f_{ZFi1}$ or $f_{ZFi2}$ clearly indicates which of these two intermediate frequencies is present. This additional information can be utilized for an accelerated control of the rated frequency of the intermediate frequency.

When the identification signal of the carrier frequency channel of a transmitter is a square wave, this has the advantage that this wave can be generated in a simple way with a digital circuit and that the harmonics having double the repetition frequency of this square wave can be contained.

For a plurality of coherent optical heterodyne means that are allocated to various groups 10 of spatially adjacent transmitters or to transmitters 11, ... 1p of receivers 21, ... 2p at a greater spatial distance from the group 10 of such transmitters, it is also advantageous when a common comb generator 4 is provided for generating a reference comb spectrum L containing reference lines $L_1$, $L_2$, ... $L_n$; $L_{11}$, ... $L_{1p}$ having reference frequencies $f_{k1}$, $f_{k2}$, ... $f_{kn}$; $f_{k11}$, ... $f_{k1p}$ for the channel carrier frequencies of all transmitters 1, 2, ... n; 11, ... 1p.

In the exemplary embodiment of FIG. 1, a common comb generator 4 is provided for the transmitters 1, 2, ... n of the group 10 and for the heterodyning means 20 of receivers 21, ... 2p. Every receiver 21, ... 2p is, for example, a coherent optical terminal to which the information signals of the group 10 in the form of a TV distribution station are conducted. Every actual receiver 11, ... 1p of every receiver 21, ... 2p is simultaneously a transmitter that transmits an optical signal to a coherent optical heterodyne means 20 contained in the receiver means 21, ... 2p. In this heterodyning means 20, this signal with the light of the reference line $f_{k11}$ or $f_{k1p}$ has a control signal for stabilizing the transmitter 11, ... 1p is obtained from the heterodyne signal. This can occur in a way similar to that for the transmitters of group 10. Since every receiver 21, ... 2p of the exemplary embodiment comprises only one transmitter 11 or, respectively, 1p, the derivation of this control signal for stabilizing the transmitter is simple in comparison to the group 10 of transmitters. Combined, the information signals $S_1$, $S_2$, ... $S_n$ emitted by the transmitters of the group 10 are conducted, for example, to an optical star coupler 6 that distributes these signals to the various receivers 21, ... 2p.

As shown in the example of FIG. 1, the parts $s_1$, $s_2$, ... $s_n$ can be acquired preceding the star coupler, but can also be acquired following the star coupler by using directional couplers on each of the outputs of the star couplers 6. Also as shown in FIG. 1, each receiver 21, ... 2p includes control means 34 similar to the control means of the group 10. Also each receiver has a filter means 30 composed of a sub-filter means 31, transducer means 32 and means 33 for generating.

Although various minor modifications may be suggested by those versed in the art, it should be understood that we wish to embody within the scope of the patent granted hereon all such modifications as reasonably and properly come within the scope of our contribution to the art.

We claim:

1. A coherent optical multi-channel arrangement comprising a plurality of spatially distributed optical transmitters for transmitting optical information signals,, each transmitter having means for frequency modulating said optical information signals with a modulation frequency within a predetermined modulation frequency range, each of the transmitters transmitting its frequency-modulated optical information signal on a respective channel at a respective carrier frequency, the respective channel carrier frequencies of said channels differing from one another by such small frequency spacings that a risk of crosstalk between the channels may be present given frequency changes of the carrier frequencies caused by instability during operation of one or more transmitters, each of the transmitters having means for additionally frequency-modulating its frequency-modulated optical information signal with a periodic identification signal, each periodic identification signal having a unique fixed repetition frequency individually allocated to its transmitter for identification of the respective transmitter; means for tapping the additionally frequency modulated, frequency-modulated optical information signals from each transmitter to obtain a plurality of tapped signals; means for forming an optical frequency comb spectrum having components respectively at a plurality of reference frequency lines at respective fixed reference frequencies, said fixed reference frequencies respectively coinciding with said carrier frequencies at said small frequency spacings from one another; coherent optical heterodyning means supplied with the tapped signal of each transmitter, for generating a heterodyned signal by respectively superimposing said tapped signals with the components of the optical frequency comb spectrum; filter means, supplied with said heterodyned signal from the heterodyning means, for transmitting the repetition frequencies of the identification signals and any frequency changes of the channel carrier frequencies contained in the heterodyned signal, and for blocking higher frequencies that are otherwise obtained in the heterodyned signal including the channel carrier frequencies of the transmitters and the modulation frequencies of the frequency-modulated optical information signals, said filter means having a filter output signal that contains the information about the repetition frequencies, said frequency changes and an allocation of the frequency changes to the repetition frequencies; and control means, supplied with said filter output signal and connected to each transmitter, for generating a respective control signal for every transmitter for controlling the channel carrier frequency of each transmitter, dependent on said information contained in the filter output signal for cancelling any existing frequency change of the carrier frequency of the transmitter.

2. A coherent optical multi-channel arrangement according to claim 1, wherein the filter means includes sub-filter means supplied with said heterodyned signal and for transmitting the repetition frequency, identification signals and frequency changes of the carrier frequencies and producing a sub-filter output signal that contains the repetition frequencies and the frequency changes, transducer means for converting the sub-filter output signal into a transduced signal that has at least one of an amplitude or a phase dependent on the frequency changes of the carrier frequencies and the repetition frequencies of the identification signals contained in the sub-filter output signal, and means supplied with said transduced signal for generating a Fourier transform of the transduced signal with Fourier coefficients uniquely allocated to the repetition frequencies, and every Fourier coefficient containing information about any frequency change of the carrier frequency identified by the repetition frequency of the Fourier coefficient.

3. A coherent optical multi-channel arrangement according to claim 2, wherein said heterodyned signal includes a heterodyned component for each transmitter, wherein the transducer means has a transducer characteristic for each heterodyned component, and wherein said transducer means comprises means for generating for each transmitter, a transduced signal centered on the carrier frequency of the transmitter and having an amplitude monotonously rising with the modulation frequency on both sides of said carrier frequency.

4. A coherent optical multi-channel arrangement according to claim 3, wherein the transducer means has a transducer characteristic with the same amplitude at a specific frequency spacing corresponding to the modulation frequency of every information signal emitted by a transmitter on each side of said carrier frequency.

5. A coherent optical multi-channel arrangement according to claim 1, wherein said heterodyning means comprises means for generating said heterodyned signal with a heterodyned component for each transmitter, each heterodyned component containing an intermediate frequency respectively established by a difference between the carrier frequency and the reference frequency for that transmitter, and each intermediate frequency in each heterodyned component being the same.

6. A coherent optical multi-channel arrangement according to claim 1, wherein said means for additionally frequency-modulating said frequency-modulated optical information signals comprises means for additionally frequency-modulating said frequency modulated optical information signals with respective identification signals each containing a fundamental wave of the repetition frequency and at least one harmonic at twice said repetition frequency.

7. A coherent optical multi-channel arrangement according to claim 6, wherein said means for additionally frequency-modulating said frequency-modulated optical information signals comprises means for generating the identification signal as a square wave.

8. A coherent optical multi-channel arrangement according to claim 1, wherein the means for generating a reference comb spectrum comprises a comb generator.

9. A coherent optical multi-channel arrangement according to claim 8, wherein said plurality of transmitters comprises a plurality of groups of transmitters, and wherein said coherent optical heterodyning means comprises a plurality of heterodyning units respectively allocated to different groups of said transmitters and wherein said comb generator is connected to all of said heterodyning units and comprises means for generating a reference comb spectrum that contains reference frequency lines having reference frequencies for the respective carrier frequencies of all transmitters.

* * * * *